Dec. 21, 1965  K. W. McKNIGHT ETAL  3,224,581
SELF-CLEANING HYDRAULIC CLASSIFIER CONTROL
Filed July 13, 1962  3 Sheets-Sheet 1

INVENTORS.
KENNETH W. McKNIGHT
CARL W. VIRANT
BY
Meyer, Baldwin, Doran & Egan
ATTORNEYS

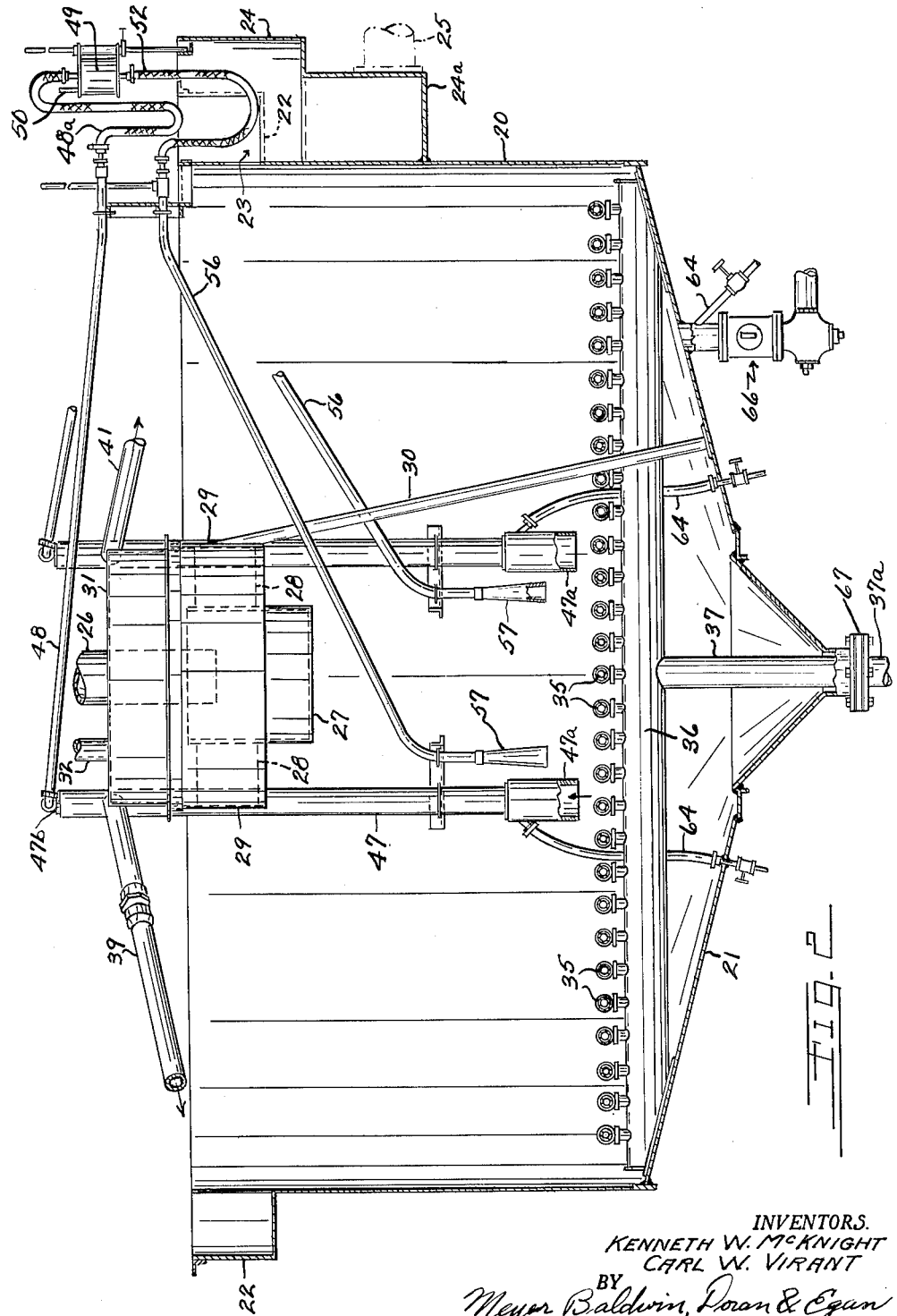

Dec. 21, 1965     K. W. McKNIGHT ETAL     3,224,581
SELF-CLEANING HYDRAULIC CLASSIFIER CONTROL
Filed July 13, 1962     3 Sheets-Sheet 3
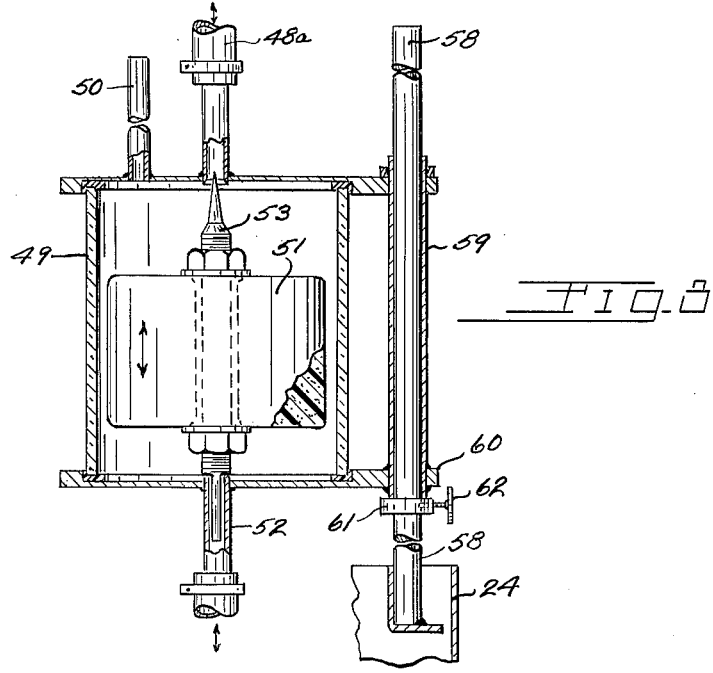
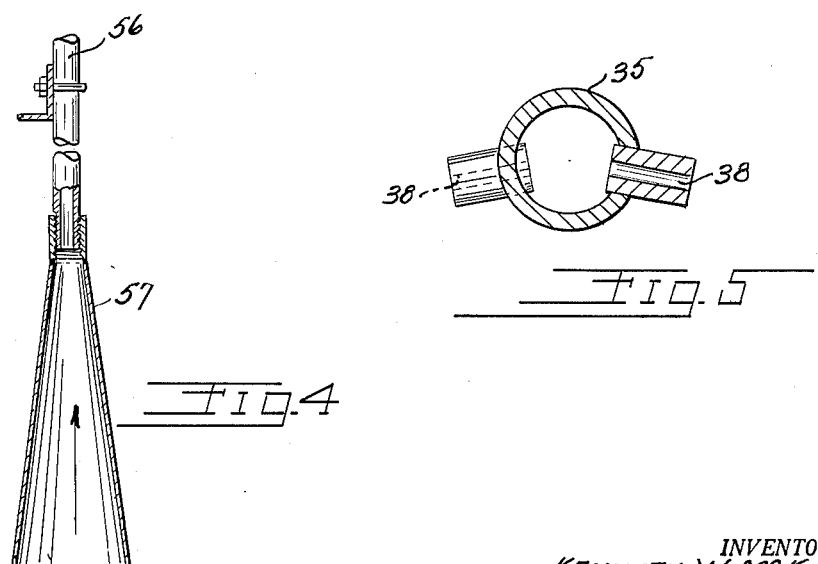
INVENTORS.
KENNETH W. McKNIGHT
CARL W. VIRANT
BY
Meyer, Baldwin, Doran & Egan
ATTORNEYS

3,224,581
SELF-CLEANING HYDRAULIC CLASSIFIER CONTROL
Kenneth W. McKnight and Carl W. Virant, Silver Bay, Minn., assignors to Reserve Mining Company, Silver Bay, Minn., a corporation of Minnesota
Filed July 13, 1962, Ser. No. 209,539
3 Claims. (Cl. 209—158)

This invention relates to novel and improved apparatus for the classification of solids in a liquid suspension. More particularly it relates to equipment for the separation of fractions having different settling characteristics in a so called "teeter" column wherein conditions of hindered settling are put to use. While the invention can be used for hydraulic sizing of various granulated or comminuted solids of respectively varying specific gravities, the present apparatus is particularly adapted for desliming concentrates of taconite ore.

An object of the invention is to provide improved siphon-sizing means for separating a water-ore slurry into two parts in a continuous process wherein discharge flow through the siphon is automatically controlled by means sensitive to the density of the slurry.

Other objects and advantages will be apparent from a study of the following description of one embodiment of the invention, in conjunction with the accompanying drawings of said embodiment, in which FIG. 1 is a top plan view, with some parts broken away, showing a hydraulic classification apparatus for the separation into two fractions of comminuted, heavier-than-water material of varying density.

FIG. 2 is a vertical sectional view, somewhat enlarged, and with some parts broken away, taken approximately on the line 2—2 of FIG. 1.

FIG. 3 is a considerably enlarged view, mostly in vertical section but partially in side elevation, showing the float control arrangement which appears in reduced scale at the upper right of FIG. 2.

FIG. 4 is an enlarged view, mostly in vertical section, showing in greater detail the inlet control for the float chamber shown in FIG. 3.

FIG. 5 is an enlarged sectional view taken on the line 5—5 of FIG. 1.

Figure 1:
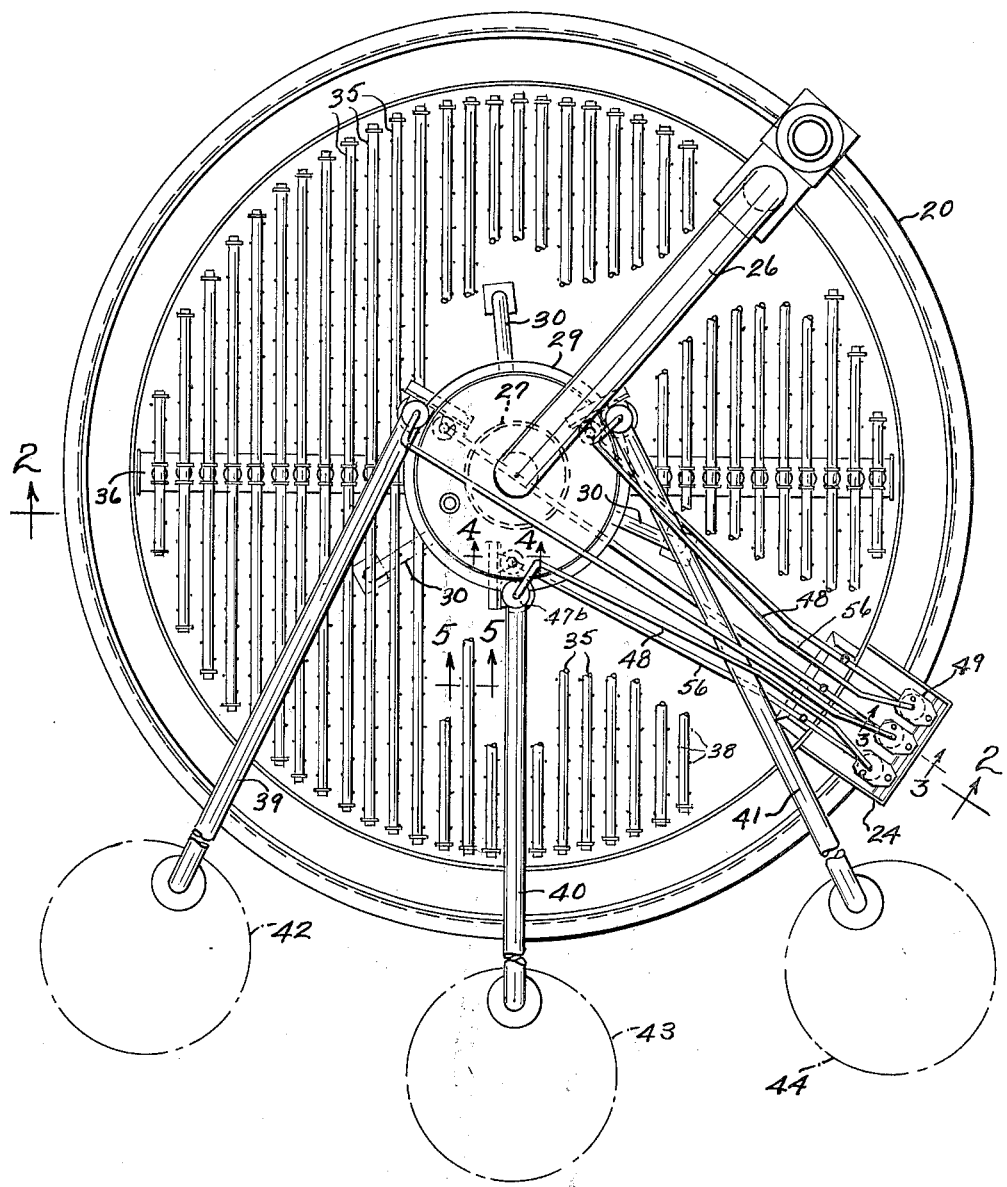

Before proceeding to a description of the apparatus shown in the drawings let us say that the term "teeter" or "teeter column" as used herein conforms to the general usage occurring in the flotation or hydraulic treatment of ores, wherein particles are maintained in a usable suspension by means of a rising stream of water within a suitable enclosure. Such enclosure is shown in FIGS. 1 and 2, and consists, in the present instance, of a tank having a cylindrical side wall 20 and a conically inclined bottom wall 21. An annular trough 22 surrounds the open upper edge of the tank, and the tank wall is provided with an overflow aperture 23 opening into the trough 22 as shown at the right side of FIG. 2. At this point also the trough discharges into overflow drop box portions 24 and 24a and thence through a conduit 25 to any disposal means. In the processing of taconite ore the overflow is mostly unwanted gangue or tailings and need not be further considered.

The tank is supplied with a liquid-solid slurry by means of a conduit 26 which empties into a centrally disposed baffle compartment 27 supported by spider plates 28 within an open bottom ring 29 which in turn is carried on three columns 30 which rest on tank bottom 21. A splash cover 31 rests on ring 29 and is provided with a vent 32. The slurry flows over the edge of compartment 27 and downwardly through ring 29. A teeter column effect is set up by means of upwardly directed jets of water from a plurality of pipes 35 which are fed from a header 36 in communication with a feed line 37 which enters through the tank bottom 21. As shown in FIG. 5 each pipe 35 is provided with jet apertures 38 suitably spaced with respect to each other and to the apertures in adjoining pipes so as to produce a more or less uniform upwardly generated turbulence, and cause the lighter solid particles to leave with the overflow into trough 22. The heavier particles will settle against the stream to a lower level from whence they are removed by a siphon system now to be described.

FIG. 1 shows in plan view the upper transverse spans 39, 40 and 41 of three separate and independent siphon systems. They proceed to respective further processing units shown in broken line at 42, 43 and 44, which may for example be magnetic separators. Each of the three siphon systems are identical, and each has its respective operating control. Only one siphon system or unit will need to be described.

Referring particularly to FIG. 1, with occasional reference to FIG. 2, the siphon outlet 29 is in flow communication with the vertical inlet pipe 47 which has an enlarged intake end at 47a. This end is located near the bottom of the teeter column and consequently is in direct flow communication with the denser fraction of the slurry, for example in the treatment of taconite ore. As a result concentrated slurry is removed by the siphon. The specific range of concentration desired can be controlled by the means now to be explained.

Siphon flow is herein made responsive to the density of liquid in the teeter column in the neighborhood of the siphon intake 47a. Basically the siphon control is effected by venting means which at times can admit air to the top of the siphon piping at 47b. This of course stops siphon flow. The air can be supplied through pipe 48 having a flexible portion 48a. When required, the air is supplied from a float chamber 49 which is vented at 50. As can best be seen in FIG. 3 the chamber 49 has therewithin a float 51 which normally rests in the position shown, wherein air from atmosphere is admitted from vent pipe 50, through the chamber, and then through piping 48a and 48 (FIG. 2) to the siphon. It can be seen however that if liquid is introduced to chamber 49 by means of pipe 52 the float will eventually rise, so as to apply the conical part of a valve member 53 to its seat at the inlet end of pipe 48a, thereby stopping air flow through the chamber to the siphon.

The float height is controlled by water introduced to chamber 49 through flexible pipe 52 and its downward continuation 56 and intake fitting 57. If this piping arrangement contains liquid of close to normal water density it will attain a level substantially higher than the overflow level of the tank at the opening 23. Since the slurry at the intake point at the foot of intake fitting 57 is at a relatively high density, it will support this excess level, and the float chamber 49 is arranged to be fixed at such a height that variation in slurry density near the siphon intake 47a and the float control pipe intake will normally produce level variations in the float chamber.

As the density increases in the lower end of the teeter column, the level of liquid in the float chamber rises, the air vent is closed, and the siphon operates. If the slurry density near the inlets 47a and 57 drops, liquid recedes from float chamber 49, the float drops so as to admit vented air to the siphon top through pipes 48 and 48a, the siphon flow is broken, and this condition persists until the density in the teeter column increases by reason of inflow through the slurry inlet 26. It will be apparent that the height of the float chamber 49 above the surface level in the tank 20 will determine the density value at which the control operates, and we have provided means for vertically adjusting the float chamber by means of the fixed support rod 58 upon which the tube 59 is freely slidable. The tube is welded to a tab 60 integral with the base of the float chamber, and a clamp ring 61 with set wheel control 62 maintains the assembly at any desired point on the rod, so as to fix the critical operational point of the siphon-sizing system.

When the float 51 rises in float chamber 49 to close the vent to the siphon, an air pocket temporarily exists in the siphon. This air pocket is quickly filled by admission of water through a pipe 64 into the intake pipe 47 of the siphon. This water climbs above the more dense slurry, and fills the siphon, to again start the flow. Water may be permitted to constantly flow through pipe 64, or it may be automated to start when the vent 50 is closed.

A any desired time the tank 20 may be drained through the outlet fitting 66, or even thoroughly by cutting of the water supply to pipe 37 and disconnecting the outer extension 37a at the flanged joint 67.

Upon operation of the system as above described, but without the conical inlet 57 for the float control tube 56, the system rapidly became inoperative because the inlet end of the pipe 56 became blocked by solid accumulation at the lower pipe end. We have found that we substitute a conical intake, such as best shown in FIG. 5, the liquid in pipe 56 and inlet 57 can undergo the necessary fluctuations without blocking the pipe 56.

We believe the conical addition to the float control tube produces the desired results for the following reason. In previously used cylindrical tube ends certain slurried materials, such as high density flocculated magnetic concentrate derived from taconite ore, tended to build up and "bridge" across the tube so as to interfere with or block the action of the hydrostatic control. With a flared or conical tube end such as we show and claim herein there is no tendency to bridge since the opening grows larger in a downward direction and the outer periphery of the bridge has no effective support.

What is claimed is:

1. Apparatus for the classification of a slurry of solid particles in liquid suspension comprising an enclosure, means for maintaining a teeter column for said suspension including means near the bottom of the enclosure for directing jets of water upwardly through said suspension, intake means for replenishing the slurry, a siphon passage including a pipe having an inlet end near the lower, denser portion of said teeter column and an outlet end outside the enclosure, an air vent at a zone in said siphon passage near its uppermost point and above the level of liquid in said column, and means for opening an air passage means to said air vent including a float chamber, a liquid-responsive movable float in said chamber adapted, by rising movement thereof to cut off air supply to said air vent and by falling movement thereof to restore air supply to said air vent, and means for varying the level of liquid in said float chamber including a water carrying control pipe having an upper end in flow communication with said float chamber and a lower end in flow communication with said teeter column near the siphon inlet end, said lower end of said control pipe having a downwardly flaring intake member opening which is greater in diameter at its lowermost edge than the diameter of said control pipe.

2. Apparatus as defined in claim 1 wherein said intake member is conical in vertical axial section.

3. Apparatus as defined in claim 1 wherein water inlet means is provided near the lower portion of said inlet end of said siphon and opening into said lower portion for restoring flow in said siphon when said vent is closed.

References Cited by the Examiner

UNITED STATES PATENTS

| | | | |
|---|---|---|---|
| 2,714,958 | 8/1955 | Evans | 209—158 |
| 2,960,226 | 11/1960 | Ekstrom | 209—158 |

HARRY B. THORNTON, *Primary Examiner.*

FRANK W. LUTTER, *Examiner.*